United States Patent
Brinkman

(10) Patent No.: US 6,911,491 B2
(45) Date of Patent: *Jun. 28, 2005

(54) HOT MELT ADHESIVE

(75) Inventor: Larry Frank Brinkman, Woodstock, IL (US)

(73) Assignee: Rohm and Haas Company, Philadelphia, PA (US)

( * ) Notice: Subject to any disclaimer, the term of this patent is extended or adjusted under 35 U.S.C. 154(b) by 342 days.

This patent is subject to a terminal disclaimer.

(21) Appl. No.: 10/117,905

(22) Filed: Apr. 8, 2002

(65) Prior Publication Data
US 2002/0174948 A1 Nov. 28, 2002

Related U.S. Application Data

(60) Provisional application No. 60/285,633, filed on Apr. 20, 2001.

(51) Int. Cl.$^7$ .......................... C08K 5/10; B29C 65/40; C08L 75/04; C09J 4/00; C09J 5/00
(52) U.S. Cl. ...................... 524/310; 524/310; 524/507; 524/871; 525/131; 156/331.4
(58) Field of Search ................................ 524/310, 513, 524/507, 270, 271, 871, 535, 529; 525/131; 526/347; 156/331.4

(56) References Cited

U.S. PATENT DOCUMENTS

| | | | | |
|---|---|---|---|---|
| 4,618,651 A | * | 10/1986 | Gilch et al. | 525/130 |
| 4,999,407 A | * | 3/1991 | Gilch et al. | 525/457 |
| 5,071,914 A | * | 12/1991 | Zimmel et al. | 525/113 |
| 5,143,961 A | * | 9/1992 | Scholl et al. | 524/317 |
| 5,459,184 A | * | 10/1995 | Bunnelle et al. | 524/221 |
| 5,521,249 A | * | 5/1996 | Guo | 525/123 |
| 5,959,023 A | * | 9/1999 | Wolf | 524/590 |
| 6,136,136 A | * | 10/2000 | Heider | 156/331.4 |
| 6,410,627 B1 | * | 6/2002 | Paul et al. | 524/277 |
| 6,579,406 B2 | * | 6/2003 | Brinkman | 156/331.4 |
| 6,624,273 B1 | * | 9/2003 | Everaerts et al. | 526/317.1 |

OTHER PUBLICATIONS

SAA Resinous Polyols: Performance Enhancers for Coatings and Inks. Product Information Bulletin [online]. Lyondell Chemical, 1999 [retrieved on May 5, 2004]. Retrieved from the Internet: <URL:www.tri–iso.com/downloads/SAA_resins.pdf>.*

* cited by examiner

*Primary Examiner*—Vasu Jagannathan
*Assistant Examiner*—Vickey Ronesi
(74) *Attorney, Agent, or Firm*—Stephen E. Johnson

(57) ABSTRACT

A moisture reactive hot melt adhesive composition formed by admixing components including a polyisocyanate, an amorphous polyol, tri-C1–C6-alkyl citrate in the amount of 1.3 to 6% by weight based on the weight of said adhesive composition, and styrene/allyl alcohol copolymer having a hydroxyl number of 100–300 and Mn of 1,000–4,000 in the amount of 0.1 to 10% by weight based on the weight of said adhesive composition, wherein the ratio of NCO/OH groups of the components on an equivalents basis is from 1.05 to 2.5, the components being free from crystalline polyesters and polyethers and the components containing less than 1%, by weight based on the total weight of the components, of water is provided. Also a method for forming the adhesive composition and a method for bonding two substrates using the adhesive are provided.

3 Claims, No Drawings

HOT MELT ADHESIVE

CROSS REFERENCE TO RELATED PATENT APPLICATIONS

This is a non-provisional application of prior pending U.S. Provisional Ser. No. 60/285,633 filed Apr. 20, 2001.

This invention relates to a hot melt adhesive composition, particularly a moisture reactive hot melt adhesive composition, a method for forming the adhesive composition, a method for bonding substrates, such as structural components, using the adhesive composition. More particularly this invention relates to a hot melt adhesive composition formed by admixing a polyisocyanate, an amorphous polyol, tri-C1–C6-alkyl citrate in the amount of 1.3 to 6% by weight based on the weight of said adhesive composition, and and certain styrene/allyl alcohol copolymers in the amount of 0.1 to 10% by weight based on the weight of said adhesive composition, of certain styrene/allyl alcohol copolymers. The hot melt adhesive composition exhibits improved adhesion to polyvinylchloride substrates ("PVC" herein).

Hot melt adhesives are desirable for their quick setting and or the absence of aqueous or solvent media which provide fluidity to other types of adhesives. Moisture reactive hot melt adhesives which are based on an isocyanate group containing urethane prepolymer can be designed to yield a relatively low melt viscosity for facile handling and application; reaction with moisture augments the final properties of the adhesive. Adhesive strength prior to completion of the reaction with moisture which is known in the art as "green strength" for the early handling of formed laminates has been found to be good for reactive hot melt adhesive composition formed by admixing a polyisocyanate, an amorphous polyol, and 0.1 to 10%, by weight based on the weight of the adhesive composition, of certain styrene/allyl alcohol copolymers. However, under some conditions adhesion to PVC may be problematic.

International Patent Application WO 00/56830 discloses certain non-tacky base polymers which are plasticized into pressure sensitive adhesives by the addition of about 1 to about 100 parts based on the base copolymer of a non-reactive, non-volatile, non-acrylic-based plasticizing agent including phthalates, adipates, polyalkylene oxides, glutarates, trimellitates, polyesters, and citrates such as acetyl tri-n-butyl citrate.

The problem faced by the inventor is the provision of a moisture reactive hot melt adhesive composition which provides effective bonding of substrates, particularly a composition having improved adhesion PVC. Surprisingly, the inventor found that the incorporation of tri-C1–C6-alkyl citrate in the amount of 1.3 to 6%, by weight based on the weight of the adhesive composition into certain moisture reactive hot melt adhesive compositions provided the desired balance of properties and improved adhesion to PVC.

According to a first aspect of the present invention there is provided a moisture reactive hot melt adhesive composition formed by admixing components including a polyisocyanate, an amorphous polyol, tri-C1–C6-alkyl citrate in the amount of 1.3 to 6% by weight based on the weight of said adhesive composition, and styrene/allyl alcohol copolymer having a hydroxyl number of 100–300 and Mn of 1,000–4,000 in the amount of 0.1 to 10% by weight based on the sight of said adhesive composition, wherein the ratio of isocyanate groups/hydroxyl groups ("NCO/OH groups") of the components on an equivalents basis is from 1.05 to 2.5, the components being free from crystalline polyesters and polyethers and the components containing less than 1%, by weight based on the total weight of the components, water.

According to a second aspect of the present invention there is provided a method for forming a moisture reactive hot melt adhesive by admixing components including a polyisocyanate, an amorphous polyol, tri-C1–C6-alkyl citrate in the amount of 1.3 to 6% by weight based on the weight of said adhesive composition, and styrene/allyl alcohol copolymer having a hydroxyl number of 100–300 and Mn of 1,000–4,000 in the amount of 0.1 to 10% by weight based on the weight of said adhesive composition, wherein the ratio of NCO/OH groups of the components on an equivalents basis is from 1.05 to 2.5, the components being free from crystalline polyesters and polyethers and the components containing lees than 1%, by weight based on the total weight of the components, water.

According to a third aspect of the present invention there is provided a method for bonding substrates by forming a moisture reactive hot melt adhesive including admixing components including a polyisocyanate, an amorphous polyol, tri-C1–C6-alkyl citrate in the amount of 1.3 to 6% by weight based on the weight of said adhesive composition, and styrene/allyl alcohol copolymer having a hydroxyl number of 100–300 and Mn of 1,000–4,000 in the amount of 0.1 to 10% by weight based on the weight of said adhesive composition, wherein the ratio of NCO/OH groups of the components on an equivalents basis is from 1.05 to 2.5, the components being free from crystalline polyesters and polyethers and the components containing less than 1%, by weight based on the total weight of the components, water; heating the adhesive to a temperature of 50° C. to 185° C.; applying the heated hot melt adhesive to a first substrate in the presence of moisture; contracting the applied heated hot melt adhesive with a second substrate; and cooling, or allowing to cool, the adhesive.

The composition of this invention is a moisture reactive hot melt adhesive composition. By "moisture reactive" is meant herein that the composition contains isocyanate groups which are capable of reacting with water desirably to effect an increase in the molecular weight of the adhesive composition and/or effect crosslinking of the adhesive composition so as to increase the strength properties of the adhesive subsequent to being contacted with water. By "hot melt" is meant herein that the adhesive which may be a solid, semi-solid or viscous mass can be advantageously heated to provide a fluid adhesive of a viscosity suitable for application to and adhesion to substrates.

The moisture reactive hot melt adhesive composition of the present invention is formed by admixing components which include a polyisocyanate, i.e., an isocyanate bearing at least two isocyanate groups. Polyisocyanates which may be used include aromatic, aliphatic, cycloaliphatic polyisocyanates and combinations thereof, such as, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4"-triphenylmethane triisocyanate, polymethylene polyphenylene polyisocyanate, 2,4,6-toluene triisocyanate, and 4,4'- dimethyl-diphenylmethane tetraisocyanate, or prepolymers having Mn less than 2000 and bearing at least two isocyanate groups. Preferred is a mixture of 4,4'-diphenylmethane diisocyanate and 2,4-diphenylmethane diisocyanate.

The moisture reactive hot melt adhesive composition of the present invention is formed by admixing components which include an amorphous polyol, by which is meant a polyol bearing two or more hydroxyl groups, which polyol does not crystallize under ambient conditions. Amorphous polyols such as amorphous polyesters and amorphous polyethers, polyester/polyethers having both ester and ether linkages, and mixtures thereof may be used. The amorphous polyols preferably have a weight average molecular weight ("Mw") as measured by gel permeation chromatograph, from 250 to 8,000, more preferably from 250 to 3,000 and preferably have an acid number less than 5, more preferably less than 2. Amorphous polyester polyols are preferably aromatic such as those formed from phthalic anhydride and diethylene glycol. Amorphous polyether polyols may be prepared by the reaction of an alkylene oxide with a polyhydric alcohol.

The moisture reactive hot melt adhesive composition of the present invention is formed by admixing components which include 1.3 to 6%, by weight based on the weight of the adhesive composition, tri-C1–C6-alkyl citrate. By tri-C1–C6-alkyl citrate is meant herein that the three citrate ester groups are independently selected from ester groups bearing C1–C6 alkyl residues such as, for example, methyl, ethyl, n-propyl, n-butyl, n-amyl, n-hexyl, i-propyl, i-butyl, i-amyl, and i-hexyl. Preferred are the tri-C1–C6-alkyl citrates in which each of the three citrate ester groups are the same such as, for example, trimethyl citrate, triethyl citrate, and tributyl citrate. Mixtures of tri-C1–C6-alkyl citrates may also be used. The tri-C1–C6-alkyl citrates are readily prepared by one skilled in the art and some are commercially available.

The moisture reactive hot melt adhesive composition of the present invention is formed by admixing components which include 0.1 to 10%, by weight based on the weight of the polyol, of a styrene/allyl alcohol addition copolymer having a hydroxyl number of 100–300 and Mn of 1,000–4,000. Such copolymers are commercially available from Lyondell Chemical, Houston, Tex. such as SAA-100, disclosed to be 70 styrene/30 allyl alcohol, on a molar basis, and SAA-103, disclosed to be 80 styrene/20 allyl alcohol, on a molar basis. By "styrene/allyl alcohol addition copolymer" herein is mean a copolymer containing at least 90 weight percent of copolymerized residues of styrene and allyl alcohol but not excluding other copolymerized monomer(s) to an extent of less than 10 weight percent based on the weight of the copolymer. Without being bound by mechanism, it is believed that the styrene/allyl alcohol copolymer which has, at ambient temperature, crystalline properties, may induce sufficient ordering in the adhesive composition into which it is incorporated to effect a useful level of green strength prior to the reaction of the adhesive with moisture. Accordingly, it is contemplated that other copolymer compositions having a hydroxyl number of 100–300 and Mn of 1,000–4,000 and exhibiting crystalline properties at ambient temperature will also be useful in the moisture reactive hot melt adhesive composition and method for bonding substrates of this invention.

The ratio of NCO/OH groups from all of the admixed components taken on an equivalents basis is from 1.05 to 2.5, preferably from 1.1 to 2.0 in order to provide an adhesive composition with an excess of isocyanate groups. The components are free from crystalline polyesters and polyethers. The components contain less than 1% water, preferably less than 0.2% water, by weight based on the total weight of the components.

The components are mixed by conventional means, preferably in an inert, dry atmosphere, and reacted, preferably at a temperature of 50° C. to 120° C. The styrene/allyl alcohol addition copolymer is preferably solubilized by heating and mixing with at least one of the non-isocyanate containing components before the reaction with the polyisocyanate. Optionally, a catalyst such as, for example, a tertiary amine or a tin-based catalyst may be admixed with the components at a level of less than 0.3% by weight based on the total weight of the admixed components, either before, during, or after the reaction to form the adhesive composition. The adhesive composition of this invention, which is a NCO-functional adhesive, is stored, preferably under an inert, dry atmosphere until use.

Without being bound by mechanism it is believed that the tertiary hydroxyl group of tri-C1–C6-alkyl citrates does not react with the polyisocyanate and an embodiment of the present invention in which the tri-C1–C6-alkyl citrate is later admixed with the reaction product of the other components is also envisioned.

The hot melt adhesive composition may be formulated by admixing additional conventional ingredients such as fillers, pigments, tackifiers, plasticizers, rheology modifiers, thermoplastic acrylic resins, etc. with due regard to the reactivity of the NCO-functional groups which are desirably maintained.

In the method for bonding substrates of the present invention the moisture reactive hot melt adhesive is heated to a temperature of 50–185° C., preferably to a temperature of 100° C. to 150° C., in order to achieve a viscosity suitable for transporting the adhesive, such as by pumping or gravity feed, to the application equipment and for the application of the adhesive to a first substrate in the presence of moisture. The application of the adhesive may be effected by conventional means such as, for example, heated spray applicator, heated bead applicator, heated nozzle, and heated roll coater, to form a continuous or discontinuous film of adhesive, as desired. The adhesive may typically be applied at a level of 3.7 to 18.6 kg/sq. meter (4–20 g/sq ft) although in cases where one of the substrates is a fabric it may be applied at a level as low as 1–40 g/sq. meter. It is contemplated that the moisture, i.e., water, which is anticipated to effect reaction with the NCO-functional groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other NCO-functional group-reactive ingredients such as, for example, amines.

Then, the applied adhesive is contacted by a second substrate to provide a laminate construction. The laminate construction so formed is optionally subjected to applied pressure such as by passing it between rollers to effect increased contact of the substrates with the adhesive and the laminate construction is then cooled or allowed to cool. In another embodiment the adhesive may be simultaneously or sequentially applied to both surfaces of the first substrate which adhesive are then simultaneously or sequentially bonded to two further substrates, which may be the same or different. It is further contemplated that the laminate construction may subsequently be bonded to other substrate(s) using the same or a different adhesive before or after the process described herein. The first and second substrates to be bonded in the method of this invention may be the same or different and include, for example, metal, wood, consolidated wood products, paper, woven and nonwoven fabrics, and plastics which may have smooth or structured surfaces and are provided in the form of rolls, sheets, films, foils, etc. They include, for example, luaun mahogany plywood ("luaun"), impregnated paper, extruded polstyrene foam, expanded polystyrene foam, fiberglass reinforced polyester, polyester fabric, high or low pressure laminate, plywood, aluminum, steel, PVC, and engineering plastics.

The following examples are presented to illustrate the invention and the results obtained by the test procedures.

Abbreviations
MDI=diphenylmethane diisocyanate
DEG-PA=diethyleneglycol-phthalic anhydride
PPG=polypropylene glycol

COMPARATIVE EXAMPLE A

Preparation and Evaluation of Comparative Hot Melt Adhesive Composition

A one liter reaction vessel was set up with, a gas inlet tube, thermometer, stirrer and a heating jacket. 12 g.70 styrene/30 allyl alcohol (molar ratios) copolymer (Mn=1500; hydroxyl number=210) (Lyondell Chemicals SAA-100), 133.8 g. PPG (Mw=1000) (BASF Corp., Mt. Olive, N.J.), 15 g. dioctyl adipate, and 54 g. castor oil (Caschem, Bayonne, N.J.) were added to the reaction vessel and the temperature raised to 110° C. with stirring. After 30 minutes at 110° C. and a vacuum of 28 inches of mercury, the temperature was lowered to 80° C. 139.2 g of a 50/50 mixture of 4,4-MDI and 2,4-MDI (LUPRANATE™ MI; BASF Corp., Mt. Olive, N.J.) was added and the temperature was held at 80–100° C. for one hour with stirring and under 28 inches of mercury. 246 g. of DEG-PA polyester (Mw=2000)(STEPANPOL™ PD 56; Stepan Chemical, Northfield, Ill.) was added and the reaction temperature was held at 80–100° C. for an additional hour with stirring under vacuum of 28 inches of mercury. At this time the reaction product was poured from the vessel hot, into a container which was then blanketed in dry nitrogen and sealed.

The product was applied to luaun, laminated to a PVC sheet, and allowed to cure for 7 days under ambient conditions, On hand peeling, the PVC released from the adhesive cleanly, i.e., adhesion to PVC was not acceptable.

COMPARATIVE EXAMPLES B–D

Preparation and Evaluation of Comparative Hot Melt Adhesive Compositions

The compositions were prepared according to the process of Comparative Example A except that 15 g of dioctyl adipate was replaced with the same amount of dipropyleneglycol dibenzoate (Comparative Example B), diisodecyl phthalate (Comparative Example C), or acetyltributyl citrate (Comparative Example D). The products were evaluated as above; in each case the the PVC released from the adhesive cleanly, i.e., adhesion to PVC was not acceptable.

EXAMPLES 1–3

Preparation and Evaluation of Hot Melt Adhesive Compositions of the Present Invention The compositions were prepared according to the process of Comparative Example A except that 15 g of dioctyl adipate was replaced with the same amount of triethyl citrate (Example 1), trimethyl citrate (Example 2), or tributyl citrate (Example 3). The products were evaluated by a flatwise tensile measurement by preparing a luaun/PVC laminate as in Comparative Example A with a 5.08 cm by 5.08 cm (2 in by 2 in) bonded area, cured for 1 week under ambient conditions, bonded to Al blocks for insertion into the jaws of an Instron tester, equilibrated to 82.2° C. (180° F.) and pulled apart at that temperature at a rate of 1.27 mm/min (0.05 in/min) with the results shown in Table 1.1

TABLE 1.1

| Flatwise Adhesion to PVC | |
| --- | --- |
| Hot Melt Adhesive | Flatwise Tensile Strength (psi) |
| Example 1 | 63 |
| Example 2 | 99 |
| Example 3 | 133 |

The hot melt adhesives of Examples 1–3 of the present invention exhibit improved and a useful level of adhesion to PVC.

EXAMPLE 4

Preparation and Evaluation of Hot Melt Adhesive Composition of the Present Invention A one liter reaction vessel was set up with, a gas inlet tube, thermometer, stirrer and a heating jacket. 12 g of a 70 styrene/30 allyl alcohol (molar ratios) copolymer (Mn=1500; hydroxyl number=210) (Lyondell Chemicals SAA-100), 141.0 g PPG (Mw=1000) (BASF Corp., Mt. Olive, N.J.), 12 g triethyl citrate, and 54 g castor oil (Caschem, Bayonne, N.J.) were added to the reaction vessel and the temperature raised to 110° C. with stirring. After 30 minutes at 110° C. and a vacuum of 28 inches of mercury, the temperature was lowered to 80° C. 135 g of 4,4-MDI (BASF Corp., Mt. Olive, N.J.) was added and the temperature was held at 80–100° C. for one hour with stirring and under 28 inches of mercury. 246 g. of DEG-PA polyester (Mw=2000) (STEPANPOL™ PD 56; Stepan Chemical, Northfield, Ill.) was added and the reaction temperature was held at 80–100° C. for an additional hour with stirring under vacuum of 28 inches of mercury. At this time the reaction product was poured from the vessel hot, into a container which was then blanketed in dry nitrogen and sealed.

The product was evaluated on PVC by a flatwise tensile test as described in Examples 1–3 at 82.2° C. (180° F.) yielding a tensile strength of 141 psi., an improved and a useful level of adhesion to PVC.

COMPARATIVE EXAMPLES E–G

Preparation and Evaluation of Comparative Hot Melt Adhesive Compositions

Preparation of Comparative Example E. A one liter reaction vessel was set up with, a gas inlet tube, thermometer, stirrer and a heating jacket. 12 g.70 styrene/30 allyl alcohol (molar ratios) copolymer (Mn=1500; hydroxyl number=210) (Lyondell Chemicals SAA-100), 142.8 g. PPG (Mw=1000) (BASF Corp., Mt. Olive, N.J.), 6 g. tributyl citrate, and 54 g. castor oil (Caschem, Bayonne, N.J.) were added to the reaction vessel and the temperature raised to 110° C. with stirring. After 30 minutes at 110° C. and a vacuum of 28 inches of mercury, the temperature was lowered to 80° C. 139.2 g of a 50/50 mixture of 4,4-MDI and 2,4-MDI (LUPRANATE™ MI; BASF Corp., Mt. Olive, N.J.) was added and the temperature was held at 80–100° C. for one hour with stirring and under 28 inches of mercury. 246 g. of DEG-PA polyester (Mw=2000)(STEPANPOL™ PD 56; Stepan Chemical, Northfield, Ill.) was added and the reaction temperature was held at 80–100° C. for an additional hour with stirring under vacuum of 28 inches of mercury. At this time the reaction product was poured from the vessel hot, into a container which was then blanketed in dry nitrogen and sealed.

Comparative Examples F–G were prepared by the process of Comparative Example E with the exception that the 6 g tributyl citrate was replaced by 6 g trimethyl citrate (Comparative Example F) or 6 g triethyl citrate (Comparative Example G).

The product was applied to luaun, laminated to a PVC sheet, and allowed to cure for 7 days under ambient conditions, On hand peeling, the PVC released from the adhesives of Comparative Examples E–G cleanly, i.e., adhesion to PVC was not acceptable.

What is claimed is:

1. A moisture reactive hot melt adhesive composition formed by admixing components comprising a polyisocyanate, an amorphous polyol, tri-C1–C6-alkyl citrate in the amount of 1.3 to 6% by weight based on the weight of said adhesive composition, and styrene/allyl alcohol copolymer having a hydroxyl number of 100–300 and Mn of 1,000–4,000 in the amount of 0.1 to 10% by weight based on the weight of said adhesive composition, wherein the ratio of NCO/OH groups of said components on an equivalents basis is from 1.05 to 2.5, said components being free from crystalline polyesters and polyethers and said components containing less than 1%, by weight based on the total weight of said components, water.

2. A method for forming a moisture reactive hot melt adhesive comprising admixing components comprising a polyisocyanate, an amorphous polyol, tri-C1–C6-alkyl citrate in the amount of 1.3 to 6% by weight based on the weight of said adhesive composition, and styrene/allyl alcohol copolymer having a hydroxyl number of 100–300 and Mn of 1,000–4,000 in the amount of 0.1 to 10% by weight based on the weight of said, adhesive composition, wherein the ratio of NCO/OH groups of said components on an equivalents basis is from 1.05 to 2.5, said components being free from crystalline polyesters and polyethers and said components containing less than 1%, by weight based on the total weight of said components, water.

3. A method for bonding substrates comprising forming a moisture reactive hot melt adhesive comprising admixing components comprising a polyisocyanate, an amorphous polyol, 1.3 o 6%, by weight based on the weight of said adhesive composition, tri-C1–C6-alkyl citrate, and 0.1 to 10%, by weight based on the weight of said adhesive composition, styrene/allyl alcohol copolymer having a hydroxyl number of 100–300 and Mn of 1,000–4,000, wherein the ratio of NCO/OH groups of said components on an equivalents basis is from 1.05 to 2.5, said components being free from crystalline polyesters and polyethers and said components containing less than 1%, by weight based on the total weight of said components, water:

heating said adhesive to a temperature of 50 C to 185 C;

applying said heated hot melt adhesive to a first substrate in the presence of moisture;

contacting said applied heated hot melt adhesive with a second substrate; and cooling, or allowing to cool, said adhesive.

* * * * *